US008152893B2

(12) United States Patent
Lin et al.

(10) Patent No.: US 8,152,893 B2
(45) Date of Patent: Apr. 10, 2012

(54) ONE DIMENSION NANO MAGNETIC WIRES AND MANUFACTURING METHOD THEREOF

(75) Inventors: Hong-Ming Lin, Taipei (TW); Wei-Syuan Lin, Taipei (TW); Wei-Jen Liou, Taipei (TW); Cheng-Han Chen, Taipei (TW); Zih-Jie Jian, Taipei (TW); She-Huang Wu, Taipei (TW)

(73) Assignees: Tatung Company, Taipei (TW); Tatung University, Taipei (TW)

( * ) Notice: Subject to any disclaimer, the term of this patent is extended or adjusted under 35 U.S.C. 154(b) by 485 days.

(21) Appl. No.: 12/321,188

(22) Filed: Jan. 16, 2009

(65) Prior Publication Data
US 2010/0133462 A1    Jun. 3, 2010

(30) Foreign Application Priority Data

Dec. 3, 2008   (TW) .............................. 97146994 A

(51) Int. Cl.
  *B22F 9/24* (2006.01)
  *B82Y 40/00* (2006.01)
(52) U.S. Cl. ............. 75/347; 75/371; 977/762; 977/896
(58) Field of Classification Search ........................ None
See application file for complete search history.

(56) References Cited

U.S. PATENT DOCUMENTS

| 6,844,492 B1* | 1/2005 | Wang et al. ...................... 174/36 |
| 6,893,886 B2* | 5/2005 | Liu et al. .......................... 438/20 |
| 7,294,560 B1* | 11/2007 | Nagahara et al. ............. 438/466 |
| 7,432,522 B2* | 10/2008 | Samuelson et al. ............. 257/12 |
| 2009/0013824 A1* | 1/2009 | Kim et al. ....................... 75/255 |

FOREIGN PATENT DOCUMENTS

| TW | 200635852 | 10/2006 |
| TW | 200637938 | 11/2006 |
| TW | 200722379 | 6/2007 |

OTHER PUBLICATIONS

Martin, J.I. et al., "Ordered magnetic Nanostructures: fabrication and properties", Journal of Magnetism and Magnetic Materials 256, 2003, pp. 449-501.*

Zeng, H. et al., "Magnetic properties of self-assembled Co nanowires of varying length and diameter", Journal of Applied Physics, vol. 87, No. 9, May 1, 2000, pp. 4718-4720.*

Xue et al., Metal nanorod arrays and their magnetic properties, Materials Science and Engineering B, 135 (2006) 74-77.

Ni et al., Studies on the one-step preparation of iron nanoparticles in solution, Journal of Crystal Growth 275 (2005) 548-553.

Cui et al., Microstructure and magnetic property of nano-Fe particles prepared by hydrogen arc plasma, Materials Science and Engineering A286 (2000) 205-207.

(Continued)

*Primary Examiner* — George Wyszomierski
(74) *Attorney, Agent, or Firm* — J.C. Patents

(57) ABSTRACT

A manufacturing method of one dimension nano magnetic wires is provided. In the method, the one dimension nano magnetic wires having high magnetization and low coercive force are synthesized from a liquid by means of reduction with an applied magnetic field under normal atmospheric temperature and pressure. The one dimension nano magnetic wire is selected from the groups consisting of iron (Fe), cobalt (Co), nickel (Ni), and composites and an alloy thereof.

10 Claims, 3 Drawing Sheets

OTHER PUBLICATIONS

Vayssieres et al., Aqueous Chemical Route to Ferromagnetic 3-D Arrays of Iron Nanorods, Nano Letters, 2002, vol. 2, No. 12, pp. 1393-1395.

Pankhurst et al., Applications of magnetic nanoparticles in biomedicine, Journal of Physics D: Applied Physics 36 (2003) R167-R181.

Liu et al., Self-assembled magnetic nanowire arrays, Applied Physics Letters 90. 103105 (2007).

Chen et al., Synthesis and Self-Assembly of fcc Phase FePt Nanorods, J. Am. Chem. Soc. 2007, 129, 6348-6349.

Bonder et al., Controlling synthesis of Fe nanoparticles with polyethylene glycol, Journal of Magnetism and Magnetic Materials 311 (2007) 658-664.

Zhao et al., Self-directed growth of iron core-shell oval-shaped nanorods and nanocubes on a H-terminated Si(100) substrate in an external magnetic field, Nanotechnology 18 (2007) 245703 (5pp).

* cited by examiner

ONE DIMENSION NANO MAGNETIC WIRES AND MANUFACTURING METHOD THEREOF

CROSS-REFERENCE TO RELATED APPLICATION

This application claims the priority benefit of Taiwan application serial no. 97146994, filed Dec. 3, 2008. The entirety of the above-mentioned patent application is hereby incorporated by reference herein and made a part of this specification.

BACKGROUND OF THE INVENTION

1. Field of the Invention

The present invention relates to a synthesis technique of one dimension nano magnetic wires. More particularly, the present invention relates to one dimension nano magnetic wires having high magnetization and low coercive force and the manufacturing method thereof.

2. Description of Related Art

Along with the miniaturization requirement for various products, science and technology have been developed from the micron generation to the so-called nano generation. Nano-materials have a variety of types, including metallic nano-materials, semiconductor nano-materials, nano-structured ceramics, and nano-polymer materials, and may have a zero dimensional structure, one dimensional structure, or two dimensional structure. The processing methods and researches of the one dimensional metallic nano-structures are the most challenging, and also the most potential ones.

Currently, the conventional methods of fabricating one dimension nano magnetic wires include the liquid phase nucleation, which requires various surfactant processes to synthesize the one dimension wires. However, this method not only requires selecting from various complex surfactants, its synthesis process also demands steps such as heating and pH adjusting due to the use of surfactants. Moreover, the surface modification (for aqueous solution use) of the one dimension wires from hydrophobic to hydrophilic has to be performed after the synthesis. Thus, the synthesis method is complicated and the process takes longer time, thereby increases the production cost in the future development.

Recently, the one dimension nano magnetic wires have been fabricated by reduction at high temperature and pressure under the gas mixture of hydrogen and inert gases. However, this method needs the synthesis to take place in a helium-containing, high temperature, and high pressure environment. The method consequently increases the risk in working environment and makes it difficult for mass production.

On the other hand, other methods of manufacturing the one dimension nano magnetic wires include using mold. However, said mold has to be firstly fabricated by light etching and other processes, and removed after synthesizing the one dimension nano magnetic wires. Hence, the manufacturing method is complicated and difficult for mass production.

As the above-mentioned methods and the conventional techniques all require more complicated steps to fabricate the one dimension nano magnetic wires, a major challenge in the current process of manufacturing the one dimension nano magnetic wires is to simplify the process while allowing mass production.

SUMMARY OF THE INVENTION

The present invention provides a manufacturing method of one dimension nano magnetic wires that can simplify the process and is suitable for mass production.

The present invention further provides one dimension nano magnetic wires having high magnetization and low coercive force.

The present invention provides a manufacturing method of one dimension nano magnetic wires. The manufacturing method includes synthesizing the one dimension nano magnetic wires by reduction of a liquid with an applied magnetic field under normal atmospheric temperature and pressure. Here, the one dimension nano magnetic wire is selected from the groups consisting of iron (Fe), cobalt (Co), nickel (Ni), and combinations and an alloy thereof.

In one embodiment of the present invention, the applied magnetic field is from 500 Guess to 20,000 Guess.

In one embodiment of the present invention, the liquid includes a precursor of the one dimension nano magnetic wires. The precursor is, for example, $FeCl_2 \cdot 2H_2O$, $FeCl_3 \cdot 6H_2O$, $FeSO_4$, $Fe_2(SO_4)_3$, $FeCO_3$, $Fe(PO_3)$, $Fe(PO_3)_2$, $Fe_3(PO_4)_2$, $Fe(NO_3)_2$, $FeSiO_3$, $Fe_2SiO_4$, $Fe(CO)_5$, $Co(NO_3)_2 \cdot 6H_2O$, $CoCl_2 \cdot 6H_2O$, $CoCO_3$, $Co_2(HPO_4)_2 \cdot H_2O$, $CoSO_4$, $NiCl_2 \cdot 6H_2O$, $Ni(NO_3)_2 \cdot 6H_2O$, $Ni(CO_3) \cdot 2Ni(OH_2) \cdot 4H_2O$, $Ni(H_2PO_2)_2 \cdot 6H_2O$ or $NiSO_4$.

In one embodiment of the present invention, the manufacturing method further includes forming a protection layer on surfaces of the one dimension nano magnetic wires. The method of forming the protection layer is to add a protecting agent into the liquid before the step of synthesizing the one dimension nano magnetic wires, for instance.

In one embodiment of the present invention, the protecting agent includes dextran, polyvinyl pyrrolidone (PVP), polyethylene glycol (PEG), chitosan, Au, $SiO_2$, $Fe_3O_4$, folic acid, Pt, tannic acid, Cu, $Cu_2O$, CuO, Ag, polymethylmethyacrylate (PMMA), polyvinyl alcohol (PVA), polyvinyl butyral (PVB) or Si.

In one embodiment of the present invention, the step of synthesizing the one dimension nano magnetic wires by reduction is, for example, flowing an inert gas continuously into the liquid and then adding a reductant with the applied magnetic field in the inert gas atmosphere. Here, the reductant is, for example, $NaBH_4$, $KBH_4$, $LiAlH_4$, $N_2H_4 \cdot H_2O$, $NaH_2PO_2 \cdot H_2O$, $Na_2SO_4$, $LiBH_4$, $RbBH_4$, $CsBH_4$, or $Na_2S_2O_3 \cdot 5H_2O$, and the inert gas includes nitrogen, argon, neon, or helium.

In one embodiment of the present invention, after synthesizing the one dimension nano magnetic wires, a stage of rinsing process is performed on the one dimension nano magnetic wires to prevent the one dimension nano magnetic wires from oxidization or degradation.

In one embodiment of the present invention, the stage of rinsing process includes, for instance, alternative repetition of alcohol rinsing and de-ionized water rinsing.

The present invention further provides a one dimension nano magnetic wires that are fabricated using the aforementioned manufacturing method. Moreover, the one dimension nano magnetic wire is selected from the groups consisting of Fe, Co, Ni, and combinations and an alloy thereof.

In another embodiment of the present invention, the one dimension nano magnetic wires are utilized as biomedical, electromagnetic shielding, electronic conducting element, or nano-probing materials.

In another embodiment of the present invention, surfaces of the one dimension nano magnetic wires may be covered with biocompatible polymers or saccharides.

In another embodiment of the present invention, surfaces of the one dimension nano magnetic wires may be covered with functional materials such as metals, ceramics, and polymers.

In light of the foregoing, the present invention utilizes an applied magnetic field when performing the liquid phase nucleation so as to obtain the one dimension nano magnetic wires with high magnetization and low coercive force. Therefore, the manufacturing method of the present invention may simplify the process and is suitable for mass production. Moreover, the one dimension nano magnetic wire surfaces may be covered with a protection layer by adding the protecting agent in the liquid phase nucleation. Consequently, oxidation of the one dimension nano magnetic wires is prevented such that the wires can be used in biomedical application or other purposes.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
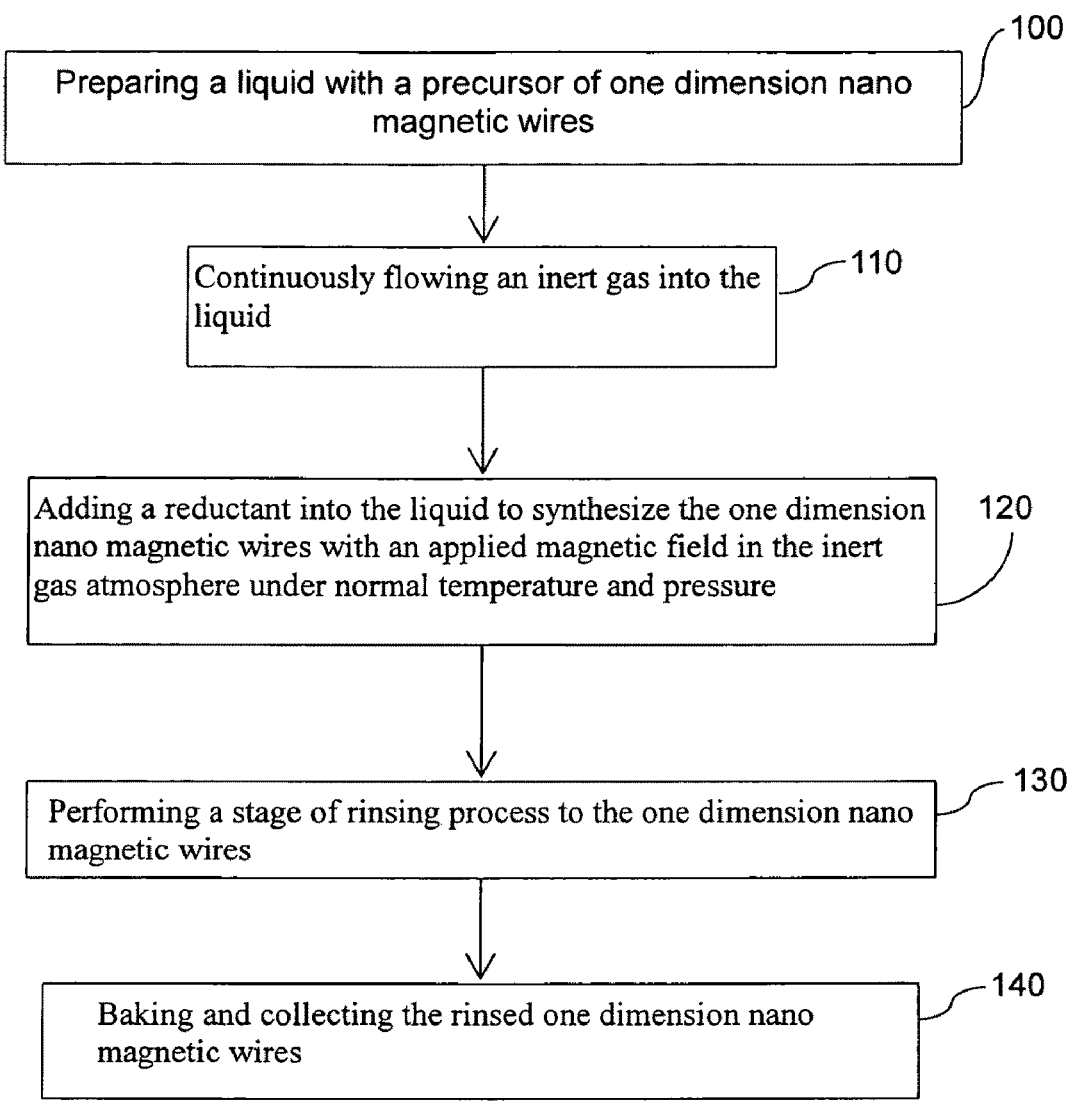
FIG. 1 is a flow diagram of a manufacturing process of one dimension nano magnetic wires according to one embodiment in the present invention.

FIG. 1 is a flow diagram of a process of one dimension nano magnetic wires according to one embodiment in the present invention.

Referring to FIG. 1, in order to manufacture the one dimension nano magnetic wires using a liquid phase nucleation method, step 100 is firstly performed to prepare a liquid with a precursor of the one dimension nano magnetic wires. The precursor is, for example, $FeCl_2 \cdot 2H_2O$, $FeCl_3 \cdot 6H_2O$, $FeSO_4$, $Fe_2(SO_4)_3$, $FeCO_3$, $Fe(PO_3)$, $Fe(PO_3)_2$, $Fe_3(PO_4)_2$, $Fe(NO_3)_2$, $FeSiO_3$, $Fe_2SiO_4$, $Fe(CO)_5$, $Co(NO_3)_2 \cdot 6H_2O$, $CoCl_2 \cdot 6H_2O$, $CoCO_3$, $Co_2(HPO_4)_2 \cdot H_2O$, $CoSO_4$, $NiCl_2 \cdot 6H_2O$, $Ni(NO_3)_2 \cdot 6H_2O$, $Ni(CO_3) \cdot 2Ni(OH_2) \cdot 4H_2O$, $Ni(H_2PO_2)_2 \cdot 6H_2O$, or $NiSO_4$.

Moreover, to prevent the manufactured one dimension nano magnetic wires from oxidizing, the manufactured one dimension nano magnetic wires can be stored in an oxygen-free environment. On the contrary, the liquid in the step 100 can be added with a protecting agent to form a protection layer on surfaces of the one dimension nano magnetic wires. Hence, it not only avoids the oxidation of the one dimension nano magnetic wires but also prevents the adhesion among the one dimension nano magnetic wires. The aforementioned protecting agent includes, for example, dextran, polyvinyl pyrrolidone (PVP), polyethylene glycol (PEG), chitosan, Au, $SiO_2$, $Fe_3O_4$, folic acid, Pt, tannic acid, Cu, $Cu_2O$, CuO, Ag, polymethylmethyacrylate (PMMA), polyvinyl alcohol (PVA), polyvinyl butyral (PVB) or Si. Consequently, the mixing of the precursor and the protecting agent produces the liquid in the present invention.

Moreover, by the selection the protecting agent, the surfaces of the subsequently synthesized one dimension nano magnetic wires will be covered by polymers, saccharides or functional materials (i.e., metals, ceramics, or polymer materials) with biocompatibility, such that the wires may be used as biomedical, electromagnetic shielding, electronic conducting element, and nano-probing materials.

Then, an inert gas is flowed into the liquid continuously in step 110, where the inert gas includes nitrogen, argon, neon, or helium, for example.

Next, in step 120, a reductant is added into the liquid to synthesize the one dimension nano magnetic wires with an applied magnetic field in the inert gas atmosphere under normal atmospheric temperature and pressure. For example, the applied magnetic field is greater than 30 Guess, preferably from 500 Guess to 20,000 Guess. Moreover, the manufactured one dimension nano magnetic wire is selected from the group consisting of iron (Fe), cobalt (Co), nickel (Ni), and composites and an alloy thereof. The reductant depends on the used precursor and includes, for instance, $NaBH_4$, $KBH_4$, $LiAlH_4$, $N_2H_4 \cdot H_2O$, $NaH_2PO_2 \cdot H_2O$, $Na_2SO_4$, $LiBH_4$, $RbBH_4$, $CsBH_4$, or $Na_2S_2O_3 \cdot 5H_2O$.

Next, step 130 can be proceeded to perform a stage of rinsing process on the one dimension nano magnetic wires to prevent the one dimension nano magnetic wires from oxidization or degradation. The aforementioned stage of rinsing process includes, for instance, alternative repetition of alcohol rinsing and de-ionized water rinsing.

Finally, step 140 may be optionally proceeded to bake and collect the rinsed one dimension nano magnetic wires.

The following shows several exemplary experiments to test the effects of the above embodiments in the present invention.

EXPERIMENT 1

Firstly, 0.5 ml of 0.5M $FeCl_3 \cdot 6H_2O$, a precursor of one dimension nano magnetic wires, is mixed evenly with 5 ml of de-ionized water. Then, 2 mg of dextran, a protecting agent, is added to the mixture to form a liquid mixed by the precursor of the one dimension nano magnetic wires and the protecting agent. Next, an inert gas (ex. argon) is flowed into the liquid for approximately half an hour.

Moreover, 3 ml of 0.1M $NaBH_4$, a reductant, is added to the liquid to synthesize the one dimension nano magnetic wires by reduction with an applied magnetic field (500-20,000 Guess) and the argon atmosphere under normal atmospheric temperature and pressure.

Afterward, the one dimension nano magnetic wires are rinsed with a stage of rinsing process (alcohol rinsing→de-ionized rinsing→alcohol rinsing), and the rinsed one dimension nano magnetic wires are dried in a 95□ oven.

EXPERIMENT 2

The same process as Experiment 1 is performed to produce the one dimension nano magnetic wires, where the only difference is the molar concentration of the reductant. In Experiment 2, 3 ml of 0.5M $NaBH_4$ is used.

Table 1 indicates the chemicals used in the two experiments and their dosages.

TABLE 1

| | De-ionized water (ml) | dextran (mg) | FeCl$_3$·6H$_2$O (0.5M)(ml) | NaBH$_4$ | Applied magnetic field |
|---|---|---|---|---|---|
| Experiment 1 | 5 | 2 | 0.5 | 0.1M (3 ml) | Yes |
| Experiment 2 | 5 | 2 | 0.5 | 0.5M (3 ml) | Yes |

Next, the one dimension nano magnetic wires obtained from the above experiments are tested.

Figure 2:
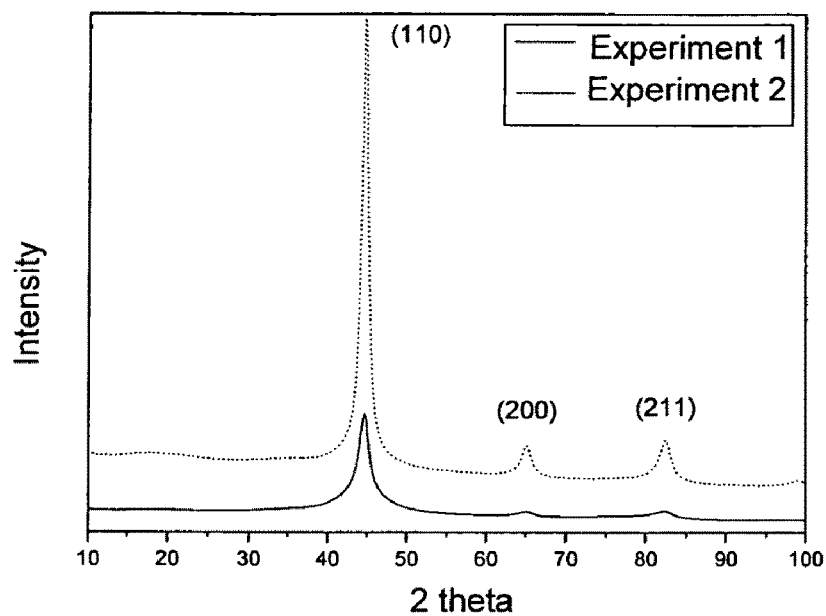
FIG. 2 is an X-ray diffraction diagram of Experiment 1 and Experiment 2 in the present invention.

An X-ray powder diffraction (XRD) test is performed with the 1C ray from National Synchrontron Radiation Research Center to obtain FIG. 2, which includes the XRD diagram of Experiment 1 and 2. As indicated in FIG. 2, iron is a component of the one dimension nano magnetic wires manufactured with (110) preferred orientation in Experiment 1 and 2.

Figure 3:
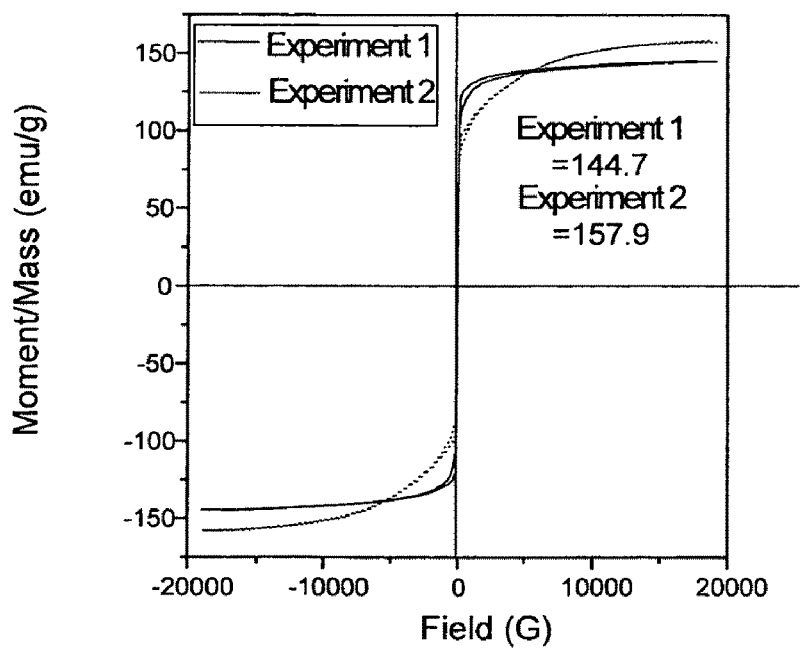
FIG. 3 is a hysteresis loop diagram of Experiment 1 and Experiment 2 in the present invention.

A test is performed with the Lake Shore 7407 type vibrating sample magnetometer (VSM) to obtain FIG. 3, which includes a hysteresis loop diagram of Experiment 1 and 2. As indicated in FIG. 3, the one dimension nano magnetic wires manufactured in Experiment 1 and 2 have high magnetization, with a value as high as 157 emu/g.

Figure 4:
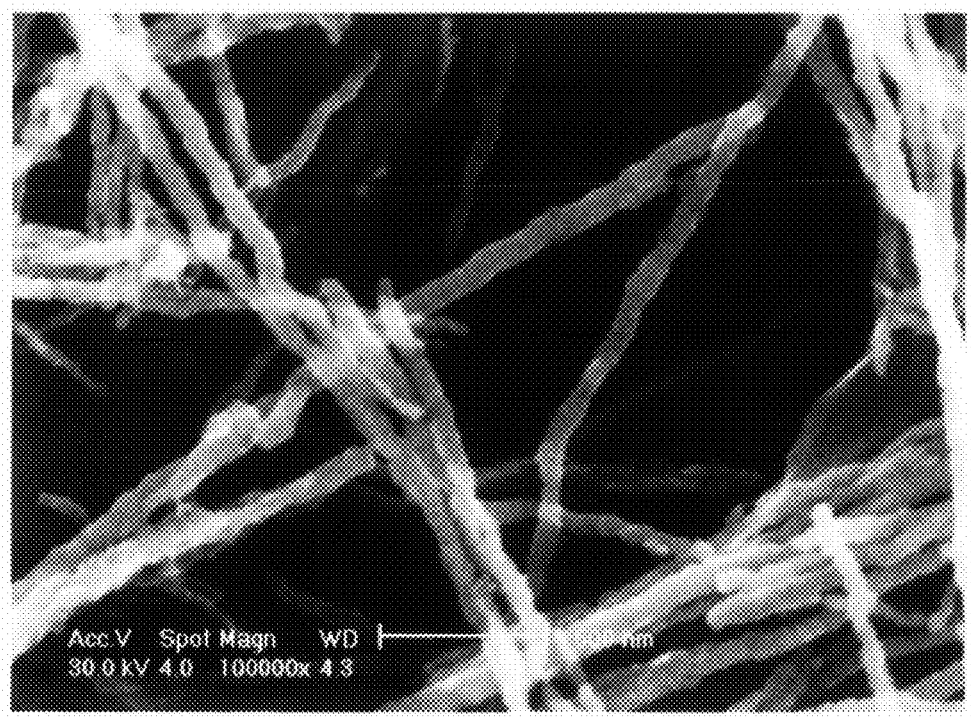
FIG. 4 is a field emission scanning electron microscope (FE-SEM) surface image of one dimension nano magnetic wires in Experiment 1 in the present invention.
Figure 5:
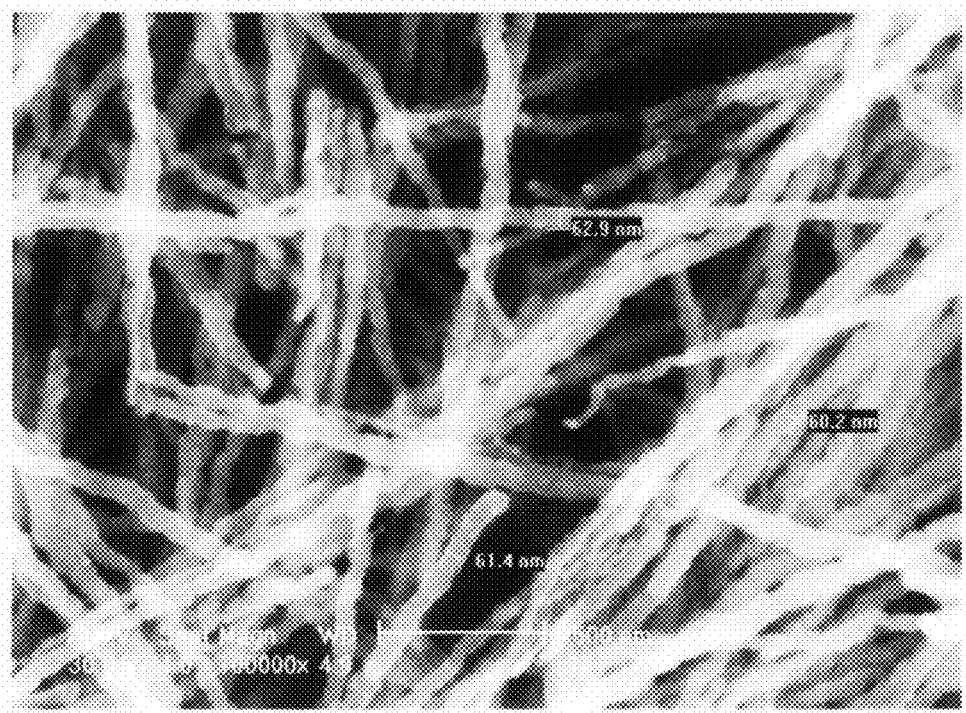
FIG. 5 is a field emission scanning electron microscope (FE-SEM) surface image of one dimension nano magnetic wires in Experiment 2 in the present invention.

A test is performed with the HITACHI S-4200 type cold field emission field emission scanning electron microscope (FE-SEM) to obtain FIG. 4 and FIG. 5. FIG. 4 is FE-SEM surface image of the one dimension nano magnetic wires in Experiment 1. FIG. 5 is a FE-SEM surface image of one dimension nano magnetic wires in Experiment 2. As observed from FIG. 4 and FIG. 5, the synthesis methods in Experiment 1 and Experiment 2 can indeed fabricate the one dimension nano-wires.

In summary, the present invention produces the one dimension nano magnetic wires having high magnetization and low coercive force by the applied magnetic field in corporation with the liquid phase nucleation method. Hence, the manufacturing method of the present invention not only simplifies the conventional processes, but it is also suitable for mass production. Furthermore, if the protecting agent is added before the liquid phase nucleation, the surfaces of the one dimension nano magnetic wires will be covered with a protection layer that prevents oxidation. Also, when the protection layer is formed by polymers or saccharides with biocompatibility, the one dimension nano magnetic wires of the present invention can be further utilized as biomedical, electromagnetic shielding, electronic conducting element, and nano-probing materials.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A manufacturing method of one dimension nano magnetic wires, comprising:
    synthesizing a plurality of one dimension nano magnetic wires by reduction from a liquid with an applied magnetic field under normal atmospheric temperature and pressure, comprising adding the liquid together with a protecting agent to form a protection layer on surfaces of the one dimension nano magnetic wires, and the plurality of one dimension nano magnetic wires comprise a metal selected from the group consisting of iron (Fe), cobalt (Co), nickel (Ni), and combinations and alloys thereof.

2. The manufacturing method as claimed in claim 1, wherein the applied magnetic field is from 500 Gauss to 20,000 Gauss.

3. The manufacturing method as claimed in claim 1, wherein the liquid comprises a precursor material of the plurality of one dimension nano magnetic wires.

4. The manufacturing method as claimed in claim 3, wherein the precursor material of the plurality of one dimension nano magnetic wires comprises $FeCl_2·2H_2O$, $FeCl_3·6H_2O$, $FeSO_4$, $Fe_2(SO_4)_3$, $FeCO_3$, $Fe(PO_3)$, $Fe(PO_3)_2$, $Fe_3(PO_4)_2$, $Fe(NO_3)_2$, $FeSiO_3$, $Fe_2SiO_4$, $Fe(CO)_5$, $Co(NO_3)_2·6H_2O$, $CoCl_2·6H_2O$, $CoCO_3$, $CO_2(HPO_4)_2·H_2O$, $CoSO_4$, $NiCl_2·6H_2O$, $Ni(NO_3)_2·6H_2O$, $Ni(CO_3)·2Ni(OH_2)·4H_2O$, $Ni(H_2PO_2)_2·6H_2O$ or $NiSO_4$.

5. The manufacturing method as claimed in claim 1, wherein the protecting agent comprises dextran, polyvinyl pyrrolidone (PVP), polyethylene glycol (PEG), chitosan, Au, $SiO_2$, $Fe_3O_4$, folic acid, Pt, tannic acid, Cu, $Cu_2O$, CuO, Ag, polymethylmethyacrylate (PMMA), polyvinyl alcohol (PVA), polyvinyl butyral (PVB) or Si.

6. The manufacturing method as claimed in claim 1, wherein the synthesis of the plurality of one dimension nano magnetic wires by reduction comprises:
    continuously flowing an inert gas into the liquid; and
    adding a reductant into the liquid in the presence of the applied magnetic field and the inert gas atmosphere.

7. The manufacturing method as claimed in claim 6, wherein the reductant comprises $NaBH_4$, $KBH_4$, $LiAlH_4$, $N_2H_4·H_2O$, $NaH_2PO_2·H_2O$, $Na_2SO_4$, $LiBH_4$, $RbBH_4$, $CsBH_4$, or $Na_2S_2O_3·5H_2O$.

8. The manufacturing method as claimed in claim 6, wherein the inert gas comprises nitrogen, argon, neon, or helium.

9. The manufacturing method as claimed in claim 1, and further comprising, after synthesizing the plurality of one dimension nano magnetic wires, performing a stage of rinsing to prevent the plurality of one dimension nano magnetic wires from oxidization or degradation.

10. The manufacturing method as claimed in claim 9, wherein the stage of rinsing comprises alternative repetition of alcohol rinsing and de-ionized water rinsing.

* * * * *